United States Patent
Keith, Jr.

(10) Patent No.: US 9,357,031 B2
(45) Date of Patent: May 31, 2016

(54) APPLICATIONS AS A SERVICE

(75) Inventor: Robert O. Keith, Jr., Modesto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 11/440,542

(22) Filed: May 24, 2006

(65) Prior Publication Data

US 2013/0204975 A1   Aug. 8, 2013

Related U.S. Application Data

(63) Continuation-in-part of application No. 11/144,263, filed on Jun. 2, 2005.

(60) Provisional application No. 60/577,148, filed on Jun. 3, 2004.

(51) Int. Cl.
*H04L 29/08* (2006.01)
*H04L 12/24* (2006.01)
*H04L 29/06* (2006.01)

(52) U.S. Cl.
CPC .............. *H04L 67/306* (2013.01); *H04L 41/00* (2013.01); *H04L 63/10* (2013.01); *H04L 67/1095* (2013.01); *H04L 67/34* (2013.01)

(58) Field of Classification Search
CPC .............. H04L 29/08072; H04L 29/06; H04L 29/0809; H04L 67/1095; H04L 67/306; H04L 67/34; H04L 12/2829; H04L 29/06836; H04L 29/08936; H04L 65/1059
USPC ................................................. 709/217, 219
See application file for complete search history.

(56) References Cited

U.S. PATENT DOCUMENTS

| | | | |
|---|---|---|---|
| 4,866,635 A | 9/1989 | Kahn et al. | 364/513 |
| 5,204,897 A * | 4/1993 | Wyman | 710/200 |
| 5,602,990 A | 2/1997 | Leete | 395/183.22 |
| 5,649,196 A | 7/1997 | Woodhill et al. | 395/620 |

(Continued)

FOREIGN PATENT DOCUMENTS

| | | | |
|---|---|---|---|
| WO | WO2005119493 A2 | 12/2005 | |
| WO | WO2005119494 A2 | 12/2005 | |

(Continued)

OTHER PUBLICATIONS http://www.backup.com.

(Continued)

*Primary Examiner* — Jimmy H Tran
(74) *Attorney, Agent, or Firm* — Thomas Wong; Doug Barker; Micky Minhas

(57) ABSTRACT

A system and method are provided for managing applications over a network between a server system and client computers. In one example, the method involves receiving user login information from a client computer, then accessing on the server system a user profile associated with the login information. The user profile includes a user environment configuration for a client environment. Transport protocols are selected based on the user profile. The transport protocols are protocols for transporting information between the server system and the client computer. The user environment configuration stored on the server system is then synchronized with a client environment configuration on the client computer.

44 Claims, 9 Drawing Sheets

(56) References Cited

U.S. PATENT DOCUMENTS

| | | | |
|---|---|---|---|
| 5,659,743 A | 8/1997 | Adams et al. | 395/621 |
| 5,787,409 A | 7/1998 | Seiffert et al. | |
| 5,802,364 A * | 9/1998 | Senator et al. | 719/325 |
| 5,812,751 A | 9/1998 | Ekrot et al. | |
| 5,835,911 A | 11/1998 | Nakagawa et al. | |
| 5,897,635 A * | 4/1999 | Torres et al. | |
| 5,930,357 A * | 7/1999 | Fukui | 705/59 |
| 5,933,647 A | 8/1999 | Aronberg et al. | |
| 5,950,010 A | 9/1999 | Hesse et al. | |
| 5,974,547 A | 10/1999 | Klimenko | 713/2 |
| 6,012,152 A | 1/2000 | Douik et al. | 714/26 |
| 6,029,196 A * | 2/2000 | Lenz | 709/221 |
| 6,067,582 A | 5/2000 | Smith et al. | |
| 6,144,959 A | 11/2000 | Anderson et al. | |
| 6,170,065 B1 | 1/2001 | Kobata et al. | 714/7 |
| 6,189,101 B1 | 2/2001 | Dusenbury, Jr. | |
| 6,209,089 B1 | 3/2001 | Selitrennikoff et al. | 713/2 |
| 6,212,660 B1 | 4/2001 | Joeressen et al. | 714/758 |
| 6,282,711 B1 | 8/2001 | Halpern et al. | |
| 6,292,827 B1 | 9/2001 | Raz | 709/217 |
| 6,301,612 B1 | 10/2001 | Selitrennikoff et al. | 709/220 |
| 6,311,221 B1 | 10/2001 | Raz et al. | 709/231 |
| 6,314,428 B1 | 11/2001 | Brew et al. | |
| 6,317,761 B1 | 11/2001 | Landsman et al. | 707/513 |
| 6,339,826 B2 * | 1/2002 | Hayes et al. | 713/166 |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,459,499 B1 | 10/2002 | Tomat | |
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | |
| 6,490,677 B1 | 12/2002 | Aguilar et al. | 713/1 |
| 6,536,037 B1 | 3/2003 | Guheen et al. | 717/151 |
| 6,553,375 B1 * | 4/2003 | Huang et al. | |
| 6,556,950 B1 | 4/2003 | Schwenke et al. | 702/183 |
| 6,574,618 B2 | 6/2003 | Eylon et al. | 707/1 |
| 6,578,142 B1 | 6/2003 | Anderson et al. | |
| 6,606,744 B1 | 8/2003 | Mikurak | 717/174 |
| 6,625,651 B1 | 9/2003 | Swartz et al. | |
| 6,625,754 B1 | 9/2003 | Aguilar et al. | |
| 6,633,782 B1 | 10/2003 | Schleiss et al. | |
| 6,636,857 B2 | 10/2003 | Thomas et al. | 707/10 |
| 6,654,797 B1 | 11/2003 | Kamper | 709/220 |
| 6,654,801 B2 | 11/2003 | Mann et al. | |
| 6,694,375 B1 | 2/2004 | Beddus et al. | 709/249 |
| 6,697,852 B1 | 2/2004 | Ryu | |
| 6,704,886 B1 | 3/2004 | Gill et al. | |
| 6,718,464 B2 | 4/2004 | Cromer et al. | 713/2 |
| 6,728,530 B1 * | 4/2004 | Heinonen et al. | 455/414.1 |
| 6,735,625 B1 | 5/2004 | Ponna | 709/223 |
| 6,751,658 B1 | 6/2004 | Haun et al. | 709/222 |
| 6,757,729 B1 * | 6/2004 | Devarakonda et al. | 709/226 |
| 6,757,894 B2 | 6/2004 | Eylon et al. | 717/177 |
| 6,795,912 B1 | 9/2004 | Itoh et al. | |
| 6,816,462 B1 | 11/2004 | Booth, III et al. | 370/248 |
| 6,816,882 B1 * | 11/2004 | Conner et al. | 709/203 |
| 6,820,180 B2 | 11/2004 | McBrearty et al. | |
| 6,854,009 B1 * | 2/2005 | Hughes | 709/220 |
| 6,857,067 B2 * | 2/2005 | Edelman | G06F 21/10 713/155 |
| 6,871,210 B1 | 3/2005 | Subramanian | 709/203 |
| 6,880,108 B1 | 4/2005 | Gusler et al. | |
| 6,885,481 B1 | 4/2005 | Dawe | |
| 6,886,020 B1 | 4/2005 | Zahavi et al. | 707/204 |
| 6,898,286 B2 * | 5/2005 | Murray | 380/202 |
| 6,915,343 B1 | 7/2005 | Brewer et al. | 709/224 |
| 6,954,853 B2 | 10/2005 | Wang et al. | |
| 6,954,930 B2 | 10/2005 | Drake et al. | |
| 6,959,235 B1 | 10/2005 | Abdel-Malek et al. | |
| 6,985,967 B1 | 1/2006 | Hipp | |
| 7,003,560 B1 | 2/2006 | Mullen et al. | |
| 7,003,663 B2 | 2/2006 | Lagosanto et al. | |
| 7,024,471 B2 | 4/2006 | George et al. | |
| 7,058,698 B2 | 6/2006 | Chatterjee et al. | |
| 7,080,118 B2 | 7/2006 | Hildebrand | |
| 7,143,307 B1 | 11/2006 | Witte et al. | |
| 7,149,698 B2 | 12/2006 | Guheen et al. | |
| 7,165,087 B1 | 1/2007 | Graupner et al. | |
| 7,175,078 B2 * | 2/2007 | Ban et al. | 235/380 |
| 7,178,166 B1 | 2/2007 | Taylor et al. | |
| 7,194,445 B2 | 3/2007 | Chan et al. | |
| 7,200,779 B1 | 4/2007 | Coss, Jr. et al. | |
| 7,210,143 B2 | 4/2007 | Or et al. | |
| 7,237,122 B2 | 6/2007 | Kadam et al. | |
| 7,260,597 B1 | 8/2007 | Hofrichter et al. | |
| 7,287,053 B2 | 10/2007 | Bodin | |
| 7,305,671 B2 * | 12/2007 | Davidov et al. | 717/172 |
| 7,328,367 B2 | 2/2008 | Ukai et al. | |
| 7,330,997 B1 | 2/2008 | Odom | |
| 7,337,311 B2 | 2/2008 | Chen et al. | |
| 7,392,046 B2 | 6/2008 | Leib et al. | |
| 7,401,125 B1 * | 7/2008 | Uchida et al. | 709/217 |
| 7,480,822 B1 | 1/2009 | Arbon et al. | |
| 7,487,383 B2 | 2/2009 | Bensinger | |
| 7,512,584 B2 | 3/2009 | Keith, Jr. | |
| 7,571,467 B1 | 8/2009 | Priestley et al. | |
| 7,577,431 B2 * | 8/2009 | Jiang | 455/432.1 |
| 7,624,086 B2 | 11/2009 | Keith, Jr. | |
| 7,627,694 B2 | 12/2009 | Sreenivasan et al. | |
| 7,664,834 B2 | 2/2010 | Keith, Jr. | |
| 7,698,487 B2 | 4/2010 | Rothman et al. | |
| 7,703,142 B1 * | 4/2010 | Wilson et al. | 726/26 |
| 7,752,486 B2 | 7/2010 | Satran et al. | |
| 7,788,524 B2 | 8/2010 | Wing et al. | |
| 7,840,514 B2 | 11/2010 | Keith, Jr. | |
| 7,844,686 B1 | 11/2010 | Keith, Jr. | |
| 7,886,031 B1 | 2/2011 | Taylor et al. | |
| 7,908,339 B2 | 3/2011 | Keith, Jr. | |
| 7,912,902 B2 | 3/2011 | Cheng et al. | |
| 8,099,378 B2 | 1/2012 | Keith, Jr. | |
| 8,126,722 B2 | 2/2012 | Robb et al. | |
| 8,175,418 B1 | 5/2012 | Keith, Jr. | |
| 8,234,238 B2 | 7/2012 | Keith, Jr. | |
| 8,244,864 B1 | 8/2012 | Bahl et al. | |
| 8,307,239 B1 | 11/2012 | Keith, Jr. | |
| 8,423,821 B1 | 4/2013 | Keith, Jr. | |
| 8,612,741 B2 | 12/2013 | Crisan et al. | |
| 2001/0034736 A1 | 10/2001 | Eylon et al. | 707/200 |
| 2001/0037323 A1 | 11/2001 | Moulton et al. | 707/1 |
| 2001/0037399 A1 | 11/2001 | Eylon et al. | 709/231 |
| 2001/0037400 A1 | 11/2001 | Raz et al. | 709/232 |
| 2001/0044850 A1 | 11/2001 | Raz et al. | 709/231 |
| 2001/0049793 A1 | 12/2001 | Sugimoto | 713/200 |
| 2002/0007418 A1 | 1/2002 | Hegde et al. | 709/231 |
| 2002/0013827 A1 * | 1/2002 | Edstrom et al. | 709/219 |
| 2002/0035674 A1 * | 3/2002 | Vetrivelkumaran et al. | 711/130 |
| 2002/0042833 A1 | 4/2002 | Hendler et al. | 709/231 |
| 2002/0049764 A1 | 4/2002 | Boothby et al. | 707/100 |
| 2002/0059505 A1 | 5/2002 | St. Pierre et al. | |
| 2002/0083183 A1 * | 6/2002 | Pujare et al. | 709/231 |
| 2002/0087625 A1 * | 7/2002 | Toll et al. | 709/203 |
| 2002/0087717 A1 | 7/2002 | Artzi et al. | 709/236 |
| 2002/0087883 A1 | 7/2002 | Wohlgemuth et al. | 713/201 |
| 2002/0087963 A1 * | 7/2002 | Eylon et al. | 717/174 |
| 2002/0091763 A1 * | 7/2002 | Shah et al. | 709/203 |
| 2002/0094868 A1 | 7/2002 | Tuck et al. | |
| 2002/0099934 A1 | 7/2002 | Cromer et al. | |
| 2002/0104080 A1 * | 8/2002 | Woodard et al. | 717/176 |
| 2002/0107920 A1 * | 8/2002 | Hotti | 709/204 |
| 2002/0107945 A1 | 8/2002 | George et al. | |
| 2002/0116585 A1 | 8/2002 | Scherr | 711/133 |
| 2002/0124092 A1 | 9/2002 | Urien | 709/229 |
| 2002/0129089 A1 | 9/2002 | Hegde et al. | 709/200 |
| 2002/0131404 A1 * | 9/2002 | Mehta et al. | 370/352 |
| 2002/0138640 A1 | 9/2002 | Raz et al. | 709/231 |
| 2002/0157089 A1 * | 10/2002 | Patel et al. | 717/178 |
| 2002/0161868 A1 | 10/2002 | Paul et al. | 709/221 |
| 2002/0161908 A1 | 10/2002 | Benitez et al. | 709/231 |
| 2002/0169797 A1 | 11/2002 | Hegde et al. | 707/500.1 |

(56) References Cited

U.S. PATENT DOCUMENTS

| | | |
|---|---|---|
| 2002/0188941 A1 | 12/2002 | Cicciarelli et al. |
| 2003/0004882 A1 | 1/2003 | Holler et al. ............... 705/51 |
| 2003/0005096 A1 | 1/2003 | Paul et al. ............... 709/222 |
| 2003/0009538 A1 | 1/2003 | Shah et al. ............... 709/219 |
| 2003/0014470 A1 | 1/2003 | Iijima |
| 2003/0031164 A1 | 2/2003 | Nabkel et al. |
| 2003/0033379 A1 | 2/2003 | Civanlar et al. ............... 709/218 |
| 2003/0036882 A1 | 2/2003 | Harper et al. |
| 2003/0037328 A1 | 2/2003 | Cicciarelli et al. |
| 2003/0041136 A1 | 2/2003 | Cheline et al. ............... 709/223 |
| 2003/0046371 A1* | 3/2003 | Falkner ............... 709/220 |
| 2003/0051128 A1 | 3/2003 | Rodriguez et al. ............... 713/100 |
| 2003/0055878 A1 | 3/2003 | Fletcher et al. |
| 2003/0061067 A1 | 3/2003 | Atwal et al. |
| 2003/0078960 A1 | 4/2003 | Murren et al. |
| 2003/0110188 A1 | 6/2003 | Howard et al. |
| 2003/0120502 A1 | 6/2003 | Robb et al. |
| 2003/0126242 A1 | 7/2003 | Chang ............... 709/222 |
| 2003/0140160 A1 | 7/2003 | Raz et al. ............... 709/231 |
| 2003/0177381 A1 | 9/2003 | Ofek et al. |
| 2003/0191730 A1 | 10/2003 | Adkins et al. |
| 2003/0204562 A1 | 10/2003 | Hwang |
| 2003/0233383 A1 | 12/2003 | Koskimies |
| 2003/0233493 A1 | 12/2003 | Boldon et al. |
| 2004/0010716 A1 | 1/2004 | Childress et al. |
| 2004/0025018 A1 | 2/2004 | Haas et al. |
| 2004/0068554 A1 | 4/2004 | Bales et al. |
| 2004/0073787 A1* | 4/2004 | Ban et al. ............... 713/159 |
| 2004/0093492 A1 | 5/2004 | Daude et al. ............... 713/156 |
| 2004/0098426 A1 | 5/2004 | Ishii et al. |
| 2004/0098486 A1 | 5/2004 | Gu et al. |
| 2004/0104927 A1 | 6/2004 | Husain et al. |
| 2004/0107273 A1 | 6/2004 | Biran et al. |
| 2004/0123153 A1 | 6/2004 | Wright et al. ............... 713/201 |
| 2004/0128346 A1 | 7/2004 | Melamed et al. ............... 709/203 |
| 2004/0148306 A1 | 7/2004 | Moulton et al. ............... 707/101 |
| 2004/0180721 A1* | 9/2004 | Rowe ............... 463/42 |
| 2004/0193876 A1 | 9/2004 | Donley et al. |
| 2004/0201604 A1 | 10/2004 | Kraenzel et al. ............... 345/700 |
| 2004/0236843 A1 | 11/2004 | Wing et al. ............... 709/219 |
| 2004/0243650 A1 | 12/2004 | McCrory et al. |
| 2004/0243928 A1 | 12/2004 | Hesmer et al. |
| 2004/0267944 A1 | 12/2004 | Britt, Jr. |
| 2005/0027846 A1 | 2/2005 | Wolfe et al. |
| 2005/0033757 A1 | 2/2005 | Greenblatt et al. |
| 2005/0033808 A1 | 2/2005 | Cheng et al. |
| 2005/0044197 A1 | 2/2005 | Lai |
| 2005/0044332 A1 | 2/2005 | de Brebisson |
| 2005/0044544 A1 | 2/2005 | Slivka et al. |
| 2005/0060281 A1 | 3/2005 | Bucher et al. |
| 2005/0071267 A1 | 3/2005 | Takahashi et al. |
| 2005/0096920 A1 | 5/2005 | Matz et al. |
| 2005/0108297 A1* | 5/2005 | Rollin et al. ............... 707/201 |
| 2005/0108546 A1 | 5/2005 | Lehew et al. |
| 2005/0108593 A1 | 5/2005 | Purushothaman et al. |
| 2005/0144218 A1 | 6/2005 | Heintz ............... 709/202 |
| 2005/0149729 A1 | 7/2005 | Zimmer et al. ............... 713/168 |
| 2005/0160289 A1 | 7/2005 | Shay |
| 2005/0188315 A1 | 8/2005 | Campbell et al. |
| 2005/0192035 A1* | 9/2005 | Jiang ............... 455/461 |
| 2005/0193245 A1 | 9/2005 | Hayden et al. |
| 2005/0198196 A1 | 9/2005 | Bohn et al. |
| 2005/0198239 A1* | 9/2005 | Hughes ............... 709/222 |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. |
| 2005/0283606 A1 | 12/2005 | Williams ............... 713/166 |
| 2005/0286435 A1 | 12/2005 | Ogawa et al. |
| 2006/0021040 A1 | 1/2006 | Boulanger et al. ............... 726/23 |
| 2006/0031377 A1 | 2/2006 | Ng et al. |
| 2006/0031407 A1 | 2/2006 | Dispensa et al. |
| 2006/0031529 A1 | 2/2006 | Keith, Jr. |
| 2006/0035713 A1 | 2/2006 | Cockerille et al. |
| 2006/0041641 A1 | 2/2006 | Breiter et al. |
| 2006/0041759 A1 | 2/2006 | Kaliski, Jr. et al. |
| 2006/0047716 A1 | 3/2006 | Keith, Jr. |
| 2006/0047946 A1 | 3/2006 | Keith, Jr. |
| 2006/0059384 A1 | 3/2006 | Helliker |
| 2006/0074943 A1 | 4/2006 | Nakano et al. |
| 2006/0095705 A1 | 5/2006 | Wichelman et al. ............... 711/171 |
| 2006/0106842 A1 | 5/2006 | Diament et al. |
| 2006/0106896 A1 | 5/2006 | Carlson et al. |
| 2006/0129459 A1 | 6/2006 | Mendelsohn |
| 2006/0143709 A1 | 6/2006 | Brooks et al. ............... 726/23 |
| 2006/0149955 A1 | 7/2006 | Velhal et al. |
| 2006/0179061 A1 | 8/2006 | D'Souza et al. |
| 2006/0224544 A1 | 10/2006 | Keith, Jr. |
| 2006/0224545 A1 | 10/2006 | Keith, Jr. |
| 2006/0233310 A1 | 10/2006 | Adams, Jr. et al. |
| 2007/0011292 A1 | 1/2007 | Fritsch et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith, Jr. |
| 2007/0239905 A1 | 10/2007 | Banerjee et al. ............... 710/22 |
| 2007/0255604 A1 | 11/2007 | Seelig |
| 2007/0271290 A1 | 11/2007 | Keith, Jr. ............... 707/101 |
| 2007/0271428 A1 | 11/2007 | Atluri |
| 2007/0274315 A1 | 11/2007 | Keith, Jr. |
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0072002 A1 | 3/2008 | Kuwahara et al. |
| 2008/0077622 A1 | 3/2008 | Keith, Jr. |
| 2008/0077630 A1 | 3/2008 | Keith, Jr. |
| 2008/0090560 A1 | 4/2008 | Bouzid et al. |
| 2008/0127294 A1 | 5/2008 | Keith, Jr. |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0075593 A1 | 3/2009 | Demirbasa et al. |
| 2009/0094362 A1 | 4/2009 | Huff |
| 2010/0050011 A1 | 2/2010 | Takamoto et al. |
| 2010/0125770 A1 | 5/2010 | Keith, Jr. |
| 2011/0047118 A1 | 2/2011 | Keith, Jr. |
| 2011/0161729 A1 | 6/2011 | Ritz et al. |
| 2012/0084364 A1 | 4/2012 | Sivavakeesar |
| 2012/0198154 A1 | 8/2012 | Keith, Jr. |
| 2012/0272099 A1 | 10/2012 | Keith, Jr. |
| 2013/0031405 A1 | 1/2013 | Keith, Jr. |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS http://www.swapdrive.com/sdbackup.asp.
http://www.macrovision.com/products/flexnet_installshield/installshield/overview/index.shtml, pp. 1-3.
http://macrovision.com/products/flexnet_installshield/installshield/index.shtml, pp. 1-2.
http://www.stealthbits.com/, pp. 1-2.
http://www.microsoft.com/technet/prodtechnol/windows2000serv/maintain/featusability/inmnwp.mspx, pp. 1-36.
http://en.wikipedia.org/wik/Expert_system, pp. 1-9.

(56) References Cited

OTHER PUBLICATIONS http://www.pctools.com/registry-mechanic/, pp. 1-2.
IBM Corporation, AFS: "User Guide", First Edition, Version 3.6. Apr. 2000, pp. 112.
Shepler et al. "RFC 3530—Network File System (NFS) version 4 Protocol", Standards Track, Apr. 2003, pp. 278, http://tools.ietf.org/html/rfc3530#page-119.
Bandwidth Capping at Source http://www.24onlinebilling.com/download/whitepapers/Bandwidth%20Capping%20At%20Source.pdf pp. 1-9.
IEEE100 The Authoritative Dictionary of IEEE Standards Terms, Seventh Edition, Jan. 2003, 3 pages.
VMware, VMware Infrastructure Architecture Overview, Jun. 14, 2006, http:/www.vmware.com/resourse/techresources/, pp. 1-14.
VMware, Using VMware Infrastructure for Backup and Restore, Oct. 26, 2006, http:/www.vmware.com/resourse/techresources/, pp. 1-20.
Microsoft@ Computer Dictionary, Fifth Edition, 2002, 3 pages.
Yu et al., "Scalable network resource management for large scale Virtual Private Networks," Simulation Modeling Practice and Theory, 12 (2004) pp. 263-285.
Cisco PIX "Configuring an IPSec Tunnel Between a Cisco Secure PIX Firewall and a Checkpoint NG Firewall," May 12, 2006, document ID 23785.
Microsoft Press, Microsoft® Computer Dictionary, Fifth Edition, May 1, 2002, p. 39.
Random House Unabridged Dictionary, "device: meaning and definitions," 1997, Random House Inc., retrieved via "http://dictionary.infoplease.com/device".
Muthitacharoen et al., "A Low-bandwidth Network File System," MIT Laboratory for Computer Science and NYU Department of Computer Science, 2001, 14 pages.
Definition of Plug-in (computing) from http:/en.wikipedia.org/wiki/Plug-in_(computing), printed Jun. 18, 2011, 1 page.
Plug-in definition from Wikipedia, http://en.wikipedia.org/wiki/Plug-in_(computing) printed Nov. 6, 2011, 5 pages.
Tridgell, A., "Efficient Algorithms for Sorting and Synchronization," Thesis, The Australian National University, Feb. 1999, 106 pages.
MacDonald, J.P., "File System Support for Delta Compression," University of California at Berkeley, Dept. of Electrical Engineering and Computer Sciences, May 19, 2000, 32 pages.
Office Action dated Feb. 16, 2016 cited in U.S. Appl. No. 14/271,027.

\* cited by examiner

500

| 502 | application vendor |
| 504 | application type |
| 506 | application name and alias names |
| 508 | application version, minor version and patch level |
| 510 | hardware and os compatibility |
| 512 | application version group |
| 514 | transport/access methods |
| 516 | xml/html component descriptions |
| 518 | http links |

Fig. 5

APPLICATIONS AS A SERVICE

RELATED APPLICATIONS(S)

This application is a continuation-in-part of U.S. patent application Ser. No. 11/144,263, filed on Jun. 2, 2005 and entitled "VIRTUAL APPLICATION MANAGER" which is hereby incorporated by reference, and which claims priority under 35 U.S.C. §119(e) of the co-owned U.S. Provisional Patent Application Ser. No. 60/577,148, filed Jun. 3, 2004, entitled "VIRTUAL MANAGEMENT SYSTEM", which is hereby incorporated by reference. The patent application is related to U.S. patent application Ser. No. 11/144,179, filed Jun. 2, 2005 and entitled "TRANSACTION BASED VIRTUAL FILE SYSTEM OPTIMIZED FOR HIGH-LATENCY NETWORK CONNECTIONS", which is herein incorporated by reference in its entirety.

FIELD OF THE INVENTION

The present invention relates to software applications. More particularly, the present invention relates to managing software applications over a network.

BACKGROUND OF THE INVENTION

In the past, the process of installing and updating applications as well as sharing information on a plurality of computers was arduous and time-consuming. Professionals would install software on each computer using compact discs (CDs), network shares or other similar methods. As mentioned, this is time-consuming as well as difficult to synchronize throughout an entire company. With the advent of computer networking, where a plurality of computers communicate together, the process became much more streamlined. Specifically, two techniques for delivering applications have been developed over the years, remote execution and local delivery.

In a remote execution embodiment, a user accesses software which is loaded and executed on a remote server under the control of the user. One example is the use of Internet-accessible CGI programs which are executed by Internet servers based on data entered by a client. A more complex system is the Win-to-Net system provided by Menta Software. This system delivers client software to the user which is used to create a Microsoft® Windows® style application window on the client machine. The client software interacts with an application program executing on the server and displays a window, which corresponds to one which would be shown if the application were installed locally. The client software is further configured to direct certain I/O operations, such as printing a file, to the client's system, to replicate the "feel" of a locally running application. Other remote-access systems, such as provided by Citrix® Systems, are accessed through a conventional Internet Browser or a proprietary client and present the user with a "remote desktop" generated by a host computer which is used to execute the software.

Since the applications are already installed on the server system, remote execution permits the user to access the programs without transferring a large amount of data. However, this type of implementation requires the supported software to be installed on the server. Thus, the server must utilize an operating system which is suitable for the hosted software. In addition, the server must support separately executing program threads for each user of the hosted software. For complex software packages, the necessary resources can be significant, limiting both the number of concurrent users of the software and the number of separate applications which can be provided.

In a local delivery embodiment, the desired application is packaged and downloaded to the user's computer. Preferably, the applications are delivered and installed as appropriate using automated processes. After installation, the application is executed. Various techniques have been employed to improve the delivery of software, particularly in the automated selection of the proper software components to install and initiation of automatic software downloads. In one technique, an application program is broken into parts at natural division points, such as individual data and library files, class definitions, etc., and each component is specially tagged by the program developer to identify the various program components, specify which components are dependent upon each other, and define the various component sets which are needed for different versions of the application.

Once such tagging format is defined in the Open Software Description ("OSD") specification, jointly submitted to the World Wide Web Consortium by Marimba Incorporated and Microsoft Corporation on Aug. 13, 1999. Defined OSD information can be used by various "push" applications or other software distribution environments, such as Marimba's Castanet product, to automatically trigger downloads of software and ensure that only the needed software components are downloaded in accordance with data describing which software elements a particular version of an application depends on.

Although on-demand local delivery and execution of software using OSD/push techniques is feasible for small programs, such as simple Java applets, for large applications, the download time can be prohibitively long. Thus, while suitable for software maintenance, this system is impractical for providing local application services on-demand because of the potentially long time between when the download begins and the software begins local execution.

In the more recent past, attempts have been made to use streaming technology to deliver software to permit an application to begin executing before it has been completely downloaded. Streaming technology was initially developed to deliver audio and video information in a manner which allowed the information to be output without waiting for the complete data file to download. For example, a full-motion video can be sent from a server to a client as a linear stream of frames instead of a complete video file. As each frame arrives at the client, it can be displayed to create a real-time full-motion video display. However, unlike the linear sequences of data presented in audio and video, the components of a software application can be executed in sequences which vary according to user input and other factors.

To address the deficiencies in prior data streaming and local software delivery systems, an improved technique of delivering applications to a client for local execution has been developed. This technique called "Streaming Modules" is described in U.S. Pat. No. 6,311,221 to Raz et al. In a particular embodiment of the "Streaming Modules" system, a computer application is divided into a set of modules, such as the various Java classes and data sets which comprise a Java applet. Once an initial module or modules are delivered to the user, the application begins to execute while additional modules are streamed in the background. The modules are streamed to the user in an order which is selected to deliver the modules before they are required by the locally executing software. The sequence of streaming can be varied in response to the manner in which the user operates the application to ensure that needed modules are delivered prior to use as often as possible. To reduce streaming time, the size of code files, such as library modules, can be reduced by substituting various coded procedures with shortened streaming "stub" procedures which act as link-time substitutes for the removed code. Suitable modules to replace are those which are not required for the initial execution of the application. As the application is running locally on the client, additional modules are streamed to the client and the stub code can be dynamically replaced as the substituted procedures are received. The stub procedure can point to a streaming engine which will request a missing procedure if the program calls it before it has been received at the client. Although effective, the stub-code substitution technique used in the "Streaming Modules" system may require a reasonable degree of processing to prepare a given application for streaming. In addition, the client software required to manage the streamed modules does not necessarily integrate cleanly with the normal routines used by the operating system executing on the client machine.

To remedy some of the remaining issues, U.S. Pat. No. 6,574,618 to Eylon et al. disclosed a method and system for executing network streamed applications. Within the system, a client computer executes an application while parts of the application code are still being retrieved from the server over a network. The additional components of the application not required for startup are continuously loaded in the background until the entire application resides on the client computer. There are a number of drawbacks with this system though. The client cannot function without the server being available. Although, the application is physically available on the client once downloaded, due to encryption or other proprietary methods of preventing unauthorized access, the application is unavailable. Further, the prior art does not permit a user to access the server and applications from multiple client locations.

SUMMARY OF THE INVENTION

What is needed is an improved system having features for addressing the problems mentioned above and new features not yet discussed. Broadly speaking, the present invention fills these needs by providing a virtual application manager. It should be appreciated that the present invention can be implemented in numerous ways, including as a method, a process, an apparatus, a system or a device. Inventive embodiments of the present invention are summarized below.

In one aspect, a system for permitting applications to be treated as a service comprises one or more servers for storing a set of applications and a set of user profiles and one or more client computers coupled to the one or more servers for receiving the set of applications modified at the one or more servers, wherein the set of user profiles determines which applications within the set of applications are received at the one or more client computers. The system further comprises one or more databases coupled to the one or more servers. The one or more databases contain the set of applications. The system further comprises a client environment stored on the one or more client computers. The set of user profiles includes a user environment configuration stored on the one or more servers. The client environment and the user environment configuration are synchronized. The set of user profiles further includes a list of one or more authorized applications to which the user is subscribed, wherein the set of applications include at least the one or more authorized applications. The set of applications include one or more unauthorized applications to which the user is not subscribed. The set of applications are able to be executed while the one or more client computers are decoupled from the one or more servers. The set of applications are stored locally. Alternatively, the set of applications are stored remotely. The set of applications are selected based on a document type. The set of applications are selected based on an operating system.

In another aspect, a system for permitting applications to be treated as a service comprises one or more servers for storing a set of applications and a set of user profiles, one or more client computers coupled to the one or more servers for receiving the set of applications modified at the one or more servers and available to the one or more client computers and one or more first databases coupled to the one or more client computers for storing data. The system further comprises one or more second databases coupled to the one or more servers. The one or more second databases contain the set of applications. The one or more second databases mirror user data. The system further comprises a client environment stored on the one or more client computers. The set of user profiles includes a user environment configuration stored on the one or more servers. The client environment and the user environment configuration are synchronized. The set of user profiles further includes a list of one or more authorized applications to which the user is subscribed, wherein the set of applications includes at least the one or more authorized applications. The set of applications includes one or more unauthorized applications to which the user is not subscribed. The set of applications are able to be executed while the one or more client computers are decoupled from the one or more servers. The set of applications are stored locally. Alternatively, the set of applications are stored remotely. The set of applications are selected based on a document type. The set of applications are selected based on an operating system.

In yet another aspect, a method of utilizing applications as a service comprises storing one or more applications on one or more servers, modifying the one or more applications on the one or more servers, accessing the one or more applications on the one or more servers with one or more client computers. One or more databases are coupled to the one or more servers. The one or more databases contain the applications. A client environment is stored on the one or more client computers. A user profile including a user environment configuration is stored on the one or more servers. The client environment and the user environment configuration are synchronized. The user profile further includes a list of one or more authorized applications to which the user is subscribed, wherein the one or more stored applications includes at least the one or more authorized applications. The one or more stored applications includes one or more unauthorized applications to which the user is not subscribed. The one or more applications are able to be executed while the one or more client computers are decoupled from the one or more servers. One or more databases are coupled to the one or more client computers. The method further comprises mirroring the data within the one or more databases at the one or more servers. The set of applications are stored locally. Alternatively, the set of applications are stored remotely. The method further comprises selecting the one or more applications based on a document type. The method further comprises selecting the one or more applications based on an operating system.

In yet another aspect, a pseudo-centrally located database system comprises one or more servers, one or more client computers coupled to the one or more servers wherein the one or more client computers receive application updates from the one or more servers and a database within the one or more computing devices for storing data locally, wherein the data is then mirrored to the one or more servers and is then accessible from any one of the one or more client computers. The application updates include upgrades, updates and patches.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 5 is a sample database record for an application of the VAM, in accordance with the present invention;

DETAILED DESCRIPTION OF THE PREFERRED EMBODIMENT

An invention for a virtual application manager is disclosed. Numerous specific details are set forth in order to provide a thorough understanding of the present invention. It will be understood, however, to one skilled in the art, that the present invention may be practiced with other specific details.

Overview of a Virtual Application Manager

Figure 1:
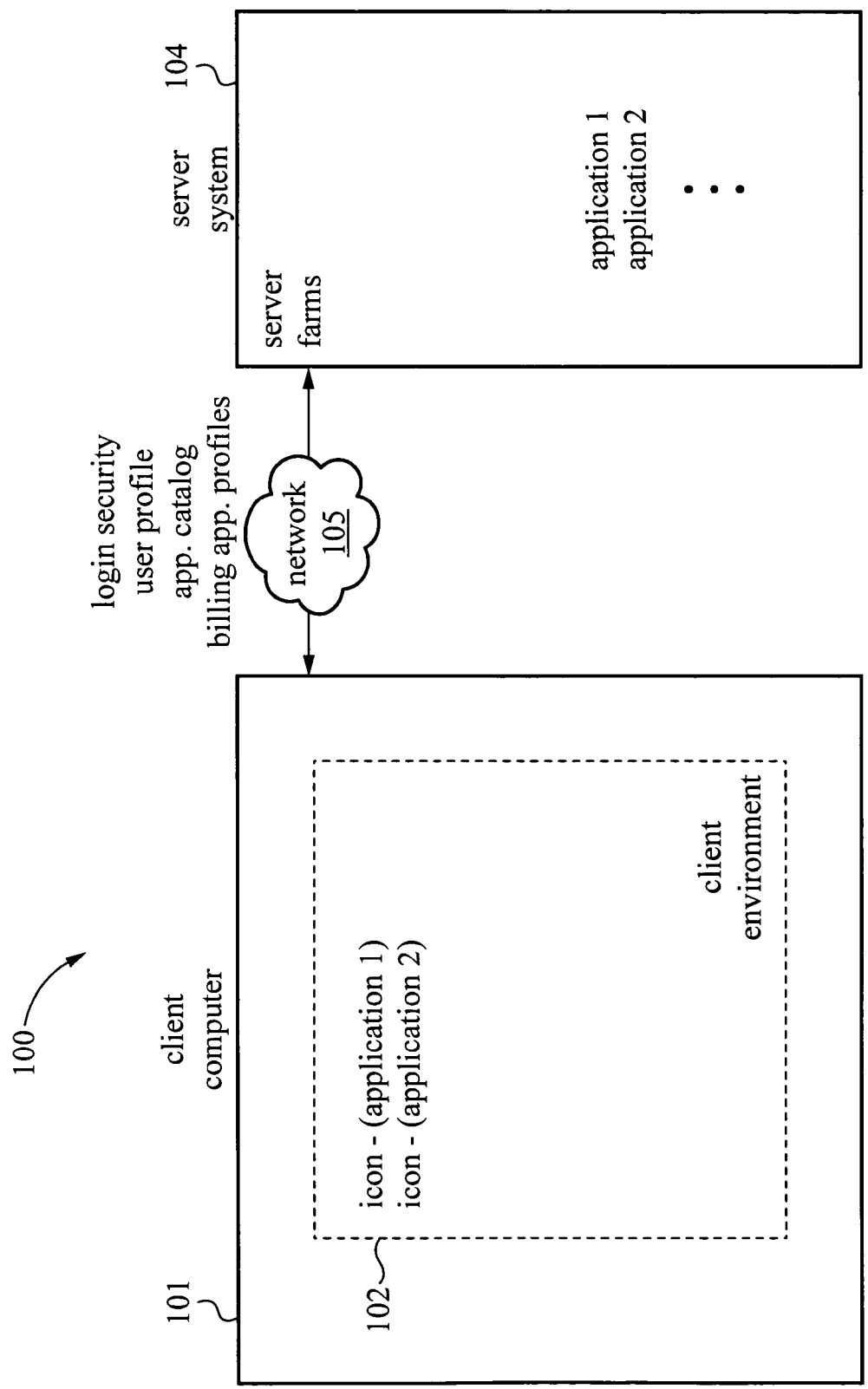
FIG. 1 is a graphical representation of a virtual application manager (VAM), in accordance with the present invention.

FIG. 1 is a graphical representation of a virtual application manager (VAM) 100, in accordance with the present invention. The VAM 100 is a group of technologies that enable a client computer 101 and other personal computing hardware devices to execute software installed and maintained on a remote server system 104. The client computer 101 includes a client environment 102, which is a graphical interface on a display device that allows the user to interact with the VAM 100. A user may define certain preferences of the client environment 102. These preferences define icons, links, colors, fonts, and other characteristics to be displayed on the display device. The client environment 102 is preferably a desktop environment, a thin client environment, a laptop environment, a personal digital assistant environment, a palmtop environment, a workstation environment, or other type of environment suitable for user interaction. The client environment 102 is stored as a user environment configuration on the server system 104. The user environment configuration is part of the user profile for the particular user.

User profiles follow a user at network login and allow the user to run the same software defined in his user profile on different hardware devices. The server system 104 maintains login security, application catalogs, billing information for each user, and application profiles. This information, maintained at a central location, increases user flexibility and mobility by eliminating reliance on a single personal hardware device. Software is installed and maintained at a central server system 104 and can be utilized at an almost unlimited number of network locations having client computers 101.

Components of a Virtual Application Manager

Figure 2:
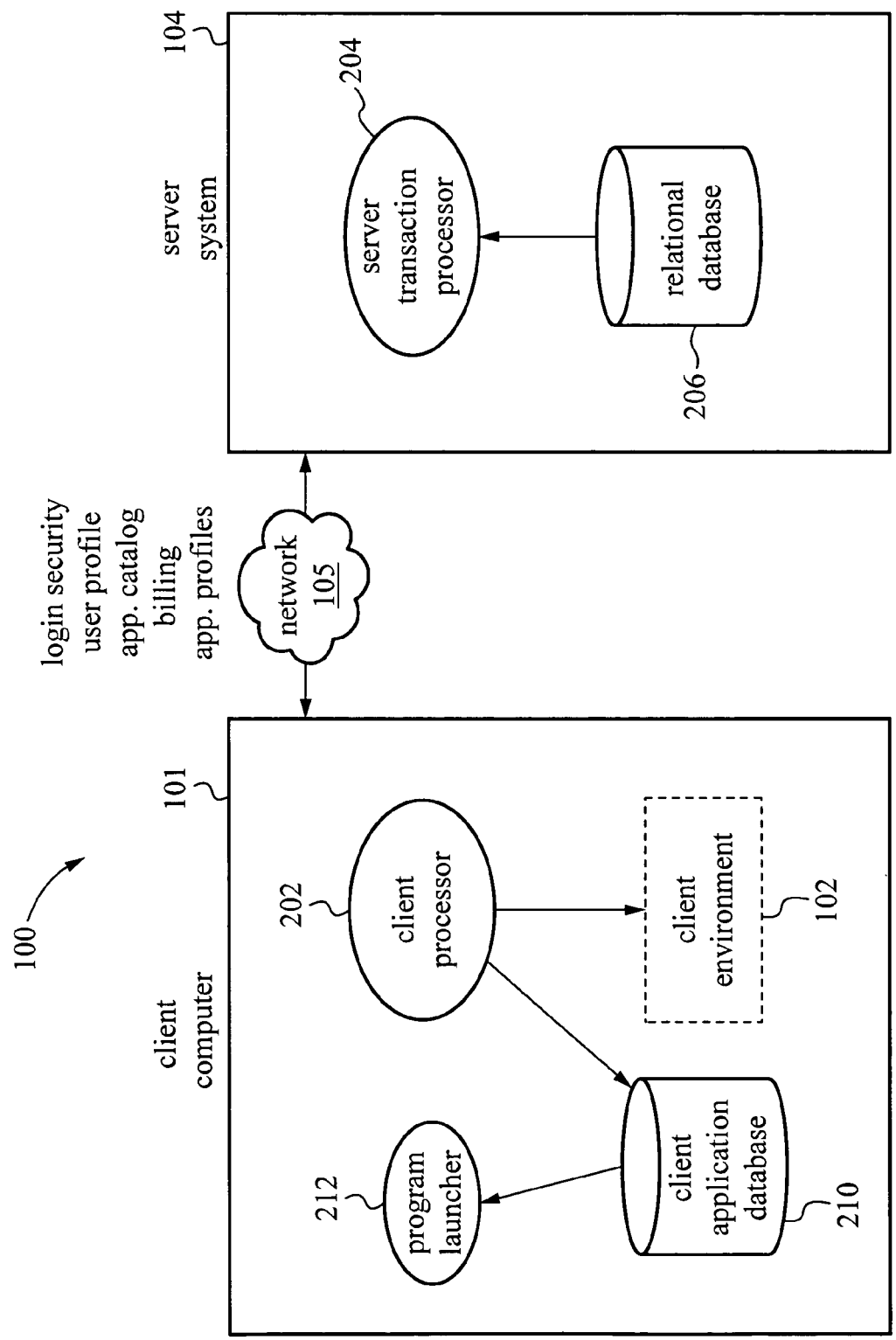
FIG. 2 is a more detailed, graphical representation of the VAM, in accordance with the present invention.

FIG. 2 is a more detailed, graphical representation of the VAM 100, in accordance with the present invention. The VAM 100 maintains an application environment, providing fast installation distribution to remote end-user hardware devices, such as a client computer 101. Each user has an account and a user profile. The user profile is centrally located on a central server system 104. The server system 104 includes a server transaction processor 204 and a relational database 206. The server system 104 maintains the user profile, which includes a list of applications to which the user is subscribed and authorized, the user's local preferences for each application, the client environment 102, and configuration of the local hardware and operating system. Such remote maintenance allows a user to move to different hardware platforms and operating environments without re-installing applications.

The VAM 100 supports multiple server and network technologies that allow an application to appear to be installed locally. However, the application is not necessarily installed locally. The application may be installed locally at the client computer 101, installed locally with the code hosted and stored remotely on the server system 104, or stored and executed on the remote server system 104.

The VAM 100 includes but is not limited to a server transaction processor 204, an application catalog, an application installation scripter, a server relational database 206, a client program launcher 212, a client application database 210, a client processor 202, and a client environment 102.

The server transaction processor 204 is a network server processor, executing requests from a client computer 101. Such requests include but are not limited to login, send list of user applications, send list of all applications, send icon graphic file, and send application detailed information.

The application catalog is a database of applications installed on the central servers of the server system 104. The application list is transmitted via the server transaction processor 204.

The application installation scripter is distributed to clients via the server transaction processor 204. The application installation scripter contains instructions for the client processor 202 on environment updates to the client environment 102. Such updates include but are not limited to registry updates, application group, and start up menu instructions.

The server relational database 206 is a commercial relational database used to support high volume, high uptime requirements of daemon processes of the server transaction processor 204.

The client program launcher 212 is a proxy program launcher that manages which application is processed, which transport is activated, etc. Accordingly, an application is not launched directly by the user. The user launches the client program launcher, which in turn handles the launching of the application.

The client application database 210 is a transient database on the client computer 101. An entire user environment is transferred over the network 105 from the server transaction processor 204 onto this transient database created on the client computer 101. This database includes such things as the list of user applications and application descriptions.

A user login client uses the server transaction processor 204 to manage the login state of the user session, receive the user password from the client computer 101, and authenticate the username and password. When the user is authenticated, the client environment maintenance modules are activated.

The client environment maintenance modules include a client software catalog module. When the user requests to add or remove an application, the client software catalog module is activated. This module updates the user profile, adding or removing the application, and updating the personal computer environment to accommodate the new application. The application installation scripter completes the application install process, allowing immediate access to the application.

In a related technology, two transport technologies for distributed virtual applications are supported, including remote network file system technology and server based computing technology. An example of remote network file system technology is a remote network operating system remote drives. Such a system allows applications to be implemented and stored on a remote storage system, but executed locally on a personal computing device. Another example of a remote network file system technology is a virtual distributed file system. In this technology, the application code is completely hosted remotely; the applications are partially and temporarily stored and executed locally; local files may or may not be available on the local file system but will have a "backing stored" copy on a remote server. Such technology is described in further detail in U.S. patent application Ser. No. 10/912, 652, entitled "Virtual Distributed File System", filed Aug. 4, 2004, which is herein incorporated by reference in its entirety.

An example of a server based computing technology is Unix® X11 xterminal protocol. In such technology, applications are stored and run on a remote Unix® system; the screen, keystroke and mouse movements are transferred over the network 105. Another example of a server based computing technology is Citrix® Technologies and Tarantella® Technologies. In such technologies, Microsoft® Windows® or Unix® applications are stored and run on a remote Unix® or Windows® server; the screen, keystroke, audio and mouse movement data is transmitted over the network 105.

A single user on a single personal computer device supports all the transport technologies described above. Such a setup provides maximum flexibility for the system administrator and shelters the user from this higher level of complexity.

In another related technology, a communications manager handles network monitoring, troubleshooting on end-user operating environments. Network deficiencies are immediately apparent and viewable by the dashboard gauges displaying network status and performance. In cases where other network paths are available, the communications manager can select alternate paths. The communications manager manages network monitoring and troubleshooting tools, network automatic disconnect and reconnect solutions, network interface, and technology arbitration technologies.

In yet another related technology, a virtual distributed data manager manages user files and databases often associated with user applications. The virtual distributed data manager includes remote network storage management of user data, synchronization of local data to a remote location and vice versa, and secure encrypted storage and management of remote data. The virtual distributed data manager is described in further detail in U.S. patent application Ser. No. 11/144, 179, entitled "Transaction Based Virtual File System Optimized For High-Latency Network Connections", which is herein incorporated by reference in its entirety.

Processes of a Virtual Application Manager

Figure 3:
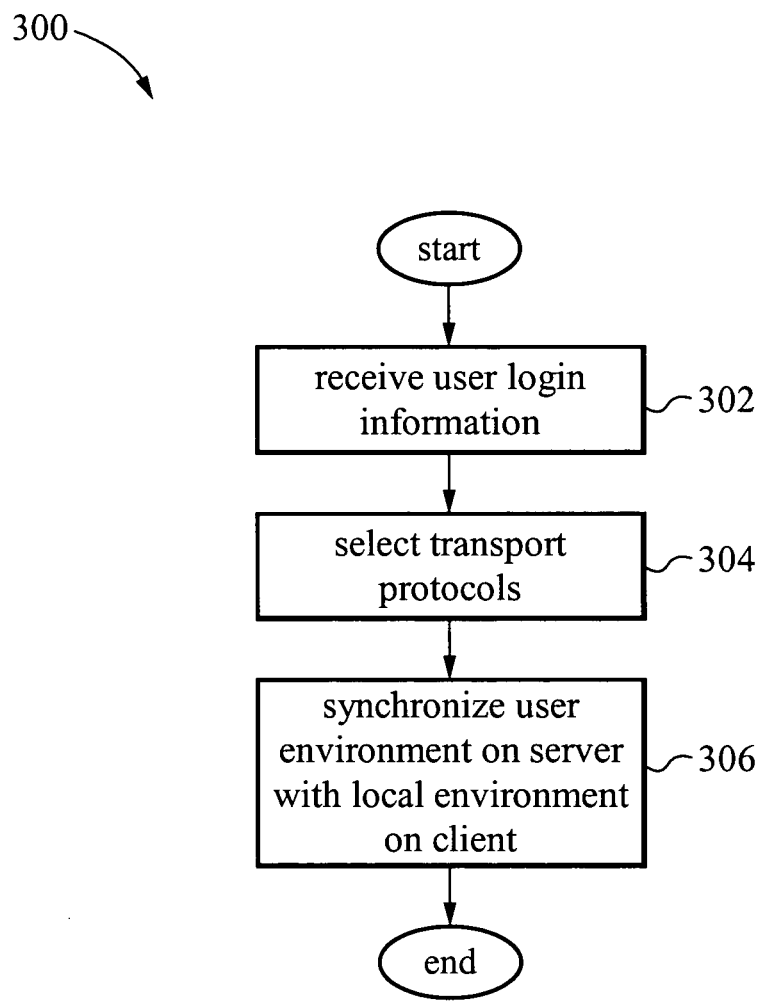
FIG. 3 is a flowchart for a user environment maintenance process of the VAM, in accordance with the present invention.

FIG. 3 is a flowchart for a user environment maintenance process 300 of the VAM 100, in accordance with the present invention. A user initially logs into the VAM 100. Accordingly, in step 302, the VAM 100 receives user login information input by a user. Such login information may contain, for example, a username and a password. Each user account has an associated user profile. The user profile includes, among other things, a list of installed applications. The user profile is editable by the user. Moving to step 304, the VAM 100 selects the appropriate transport protocols or network access methods based on the user profile and parameters initially defined by the central administrator's installation selection. Each of the network access methods support server based remote hosted application storage or server based application execution. Accordingly, moving from one client to a different client is a rapid process because transferring the application code from the server system 104 to the different client is not required. Then, in step 306, the manager synchronizes the user environment configuration on the server system 104 with the client environment on the client computer 101. In an alternative embodiment, the step of synchronization takes place at a time other than during the time of login. For example, the user may input a request to perform synchronization procedures at another convenient time while the user is logged into the VAM 100.

Figure 4:
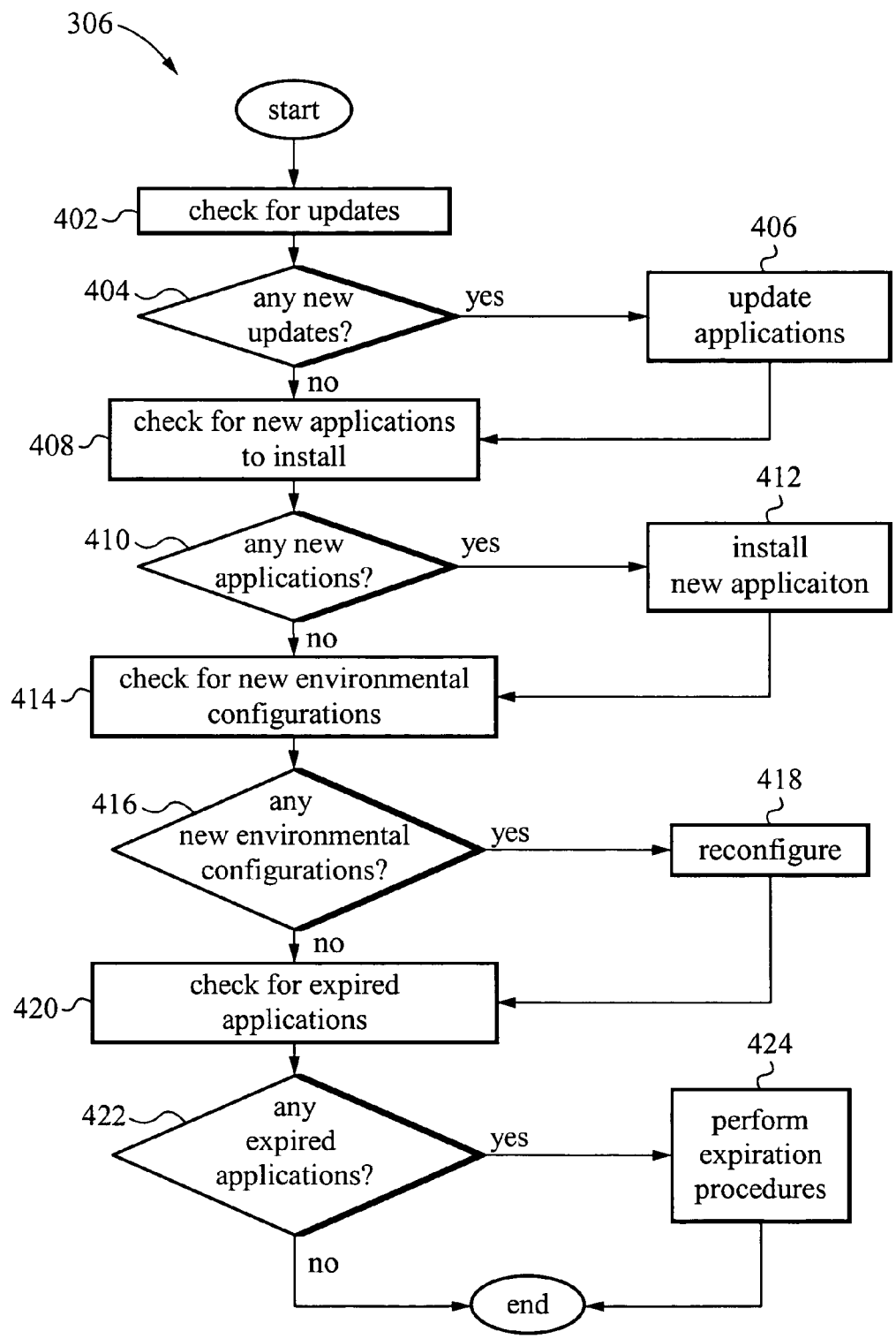
FIG. 4 is a flowchart of the synchronization process of the VAM, in accordance with the present invention.

FIG. 4 is a flowchart of the synchronization process 306 of the VAM 100, in accordance with the present invention. In step 402, the VAM 100 checks the user profile for updates to the previously installed applications. If the VAM 100 determines in decision operation 404 that no new updates are available, the synchronization process 306 proceeds to step 408. However, if the VAM 100 determines in decision operation 404 that new updates are available, the VAM 100 updates the appropriate applications in step 406. This update process involves downloading application updates from the server system 104 to the client computer 101. The synchronization process 306 then proceeds to step 408.

The VAM 100 checks the user profile in step 408 for new applications to be installed on the client computer 101. If the VAM 100 determines in decision operation 410 that no new applications are to be installed, the synchronization process proceeds to step 414. On the other hand, if the VAM 100 determines in decision operation 410 that new applications are to be installed, the VAM 100 installs the new applications in step 412. Many applications have server based installation mechanisms provided by software vendors. In the cases where network installation is not provided, tools and technologies are built into the VAM 100. Examples of such tools include tracking of new install net change to the system and distributing custom install scripting language throughout the system. Smaller software packages run from the network substantially the same as when installed to a local drive. Larger applications are more sophisticated and often require administrator customization. The software tools help administrators tune network installations to reduce or eliminate end-user interaction with installations on end-user systems. The synchronization process 306 then proceeds to step 414.

The VAM 100 checks the user profile in step 414 for any new environment configurations. If the VAM 100 determines in decision operation 416 that no new environment configurations are available, the synchronization process proceeds to step 420. However, if the VAM 100 determines in decision operation 416 that new environment configurations are available, the VAM 100 reconfigures the environment in step 418. Environment configurations include but are not limited to registry entries, temporary file directories created and file permissions, application icons, and application links. Application icons are downloaded from the server system 104 and stored locally for use on the client computer 101. As an example, when a particular icon is not on the local client computer 101 but is part of the environment configuration, that particular icon is transferred from the server system 104 to the local client computer 101. Likewise, application links are added to the desktop, user groups, the start menu and other locations as defined by the environment configuration. The synchronization process 306 then proceeds to step 420.

The VAM 100 checks the client computer 101 in step 420 for expired applications. If the VAM 100 determines in decision operation 422 that the client computer 101 has no expired applications, the synchronization process 306 is completed. On the other hand, if the VAM 100 determines in decision operation 422 that the client computer 101 does have expired applications, the VAM 100 performs expiration procedures in step 424. Upon user login, user profiles stored on the server system 104 contain an application expiration time and date value. Each application has its own expiration stamp. The central server system 104 maintains this expiration information. Application modules are stored on the client computer 101 encrypted. Accordingly, these application modules are unavailable for use outside of the virtual application manager program launcher 212. Such encryption prevents the user from executing the software in violation of the expiration time and date stamps. For an expired application, desktop icons and start menu links disappear from the client environment 102, or are grayed out to indicate the application is inactive or unavailable. The synchronization process 306 is then completed.

Note that the steps of the synchronization process 306 may be executed in an order other than the specific order illustrated by FIG. 4. For example, in an alternative embodiment, step 408 checking for new applications may come before step 402, checking for application updates. Further, the synchronization process 306 is not limited to the specific synchronization steps illustrated in FIG. 4, and may include other appropriate synchronization steps. Conversely, the synchronization process 306 does not necessarily have to include all of the steps illustrated in FIG. 4.

FIG. 5 is a sample database record 500 for an application of the VAM 100, in accordance with the present invention. The server system 104 maintains such records for available applications installed on the server system 104. Application attributes stored in this database record 500 include but are not limited to the application vendor 502; the application type 504; the application name and alias names 506; the application version, mirror version and patch level 508; the hardware and operating system compatibility 510; the application version group 512; the transport and access methods 514; the XML or HTML descriptions; and the HTTP links. Other information related to the application that may be stored in the server system 104 includes but is not limited to usage statistics by user, software modules related to each application, software module usage statistics, software reviews and ratings, user software feedback ratings, billing prices and billing usage logs, and statistics such as size of application.

Figure 6:
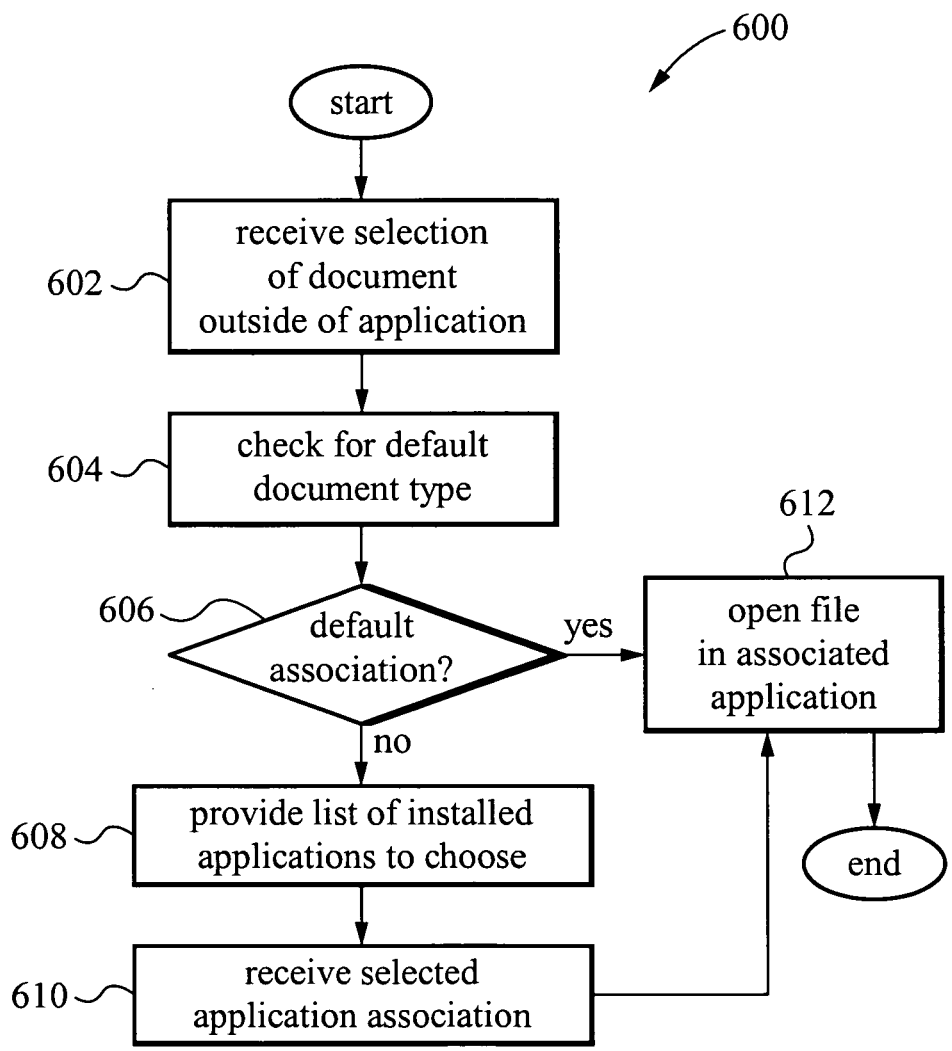
FIG. 6 is a flowchart for a document type compatibility process of the VAM, in accordance with the present invention.

FIG. 6 is a flowchart for a document type compatibility process 600 of the VAM 100, in accordance with the present invention. The VAM 100 maintains a mapping between document (or file) types and appropriate applications that can support the document data formats. In some cases, a user may select a document outside of an application. Accordingly, in step 602, the VAM 100 receives the selection of the document that the user made outside of an application. The manager then checks, in step 604, for a default document type that may already be associated with the selected document. If the VAM 100 determines in decision operation 606 that a default association is available, the compatibility process 600 proceeds to step 612. On the other hand, if the manager determines in decision operation 606 that a default association is not available, the compatibility process 600 moves to step 608.

The VAM 100 provides, in step 608, a list of installed applications that may be associated with the selected document. As an alternative to step 608, the VAM 100 may provide another mechanism for selecting a document type. For example, the VAM 100 may respond to a user right clicking the mouse on a document by providing a list of installed applications having the ability to utilize the selected document and to read the document formats. The user may then select from the provided list of installed applications. In step 610, the VAM 100 receives the selected application association. The compatibility process 600 then proceeds to step 612.

The manager opens the file in the associated application in step 612. The compatibility process is then completed.

Figure 7:
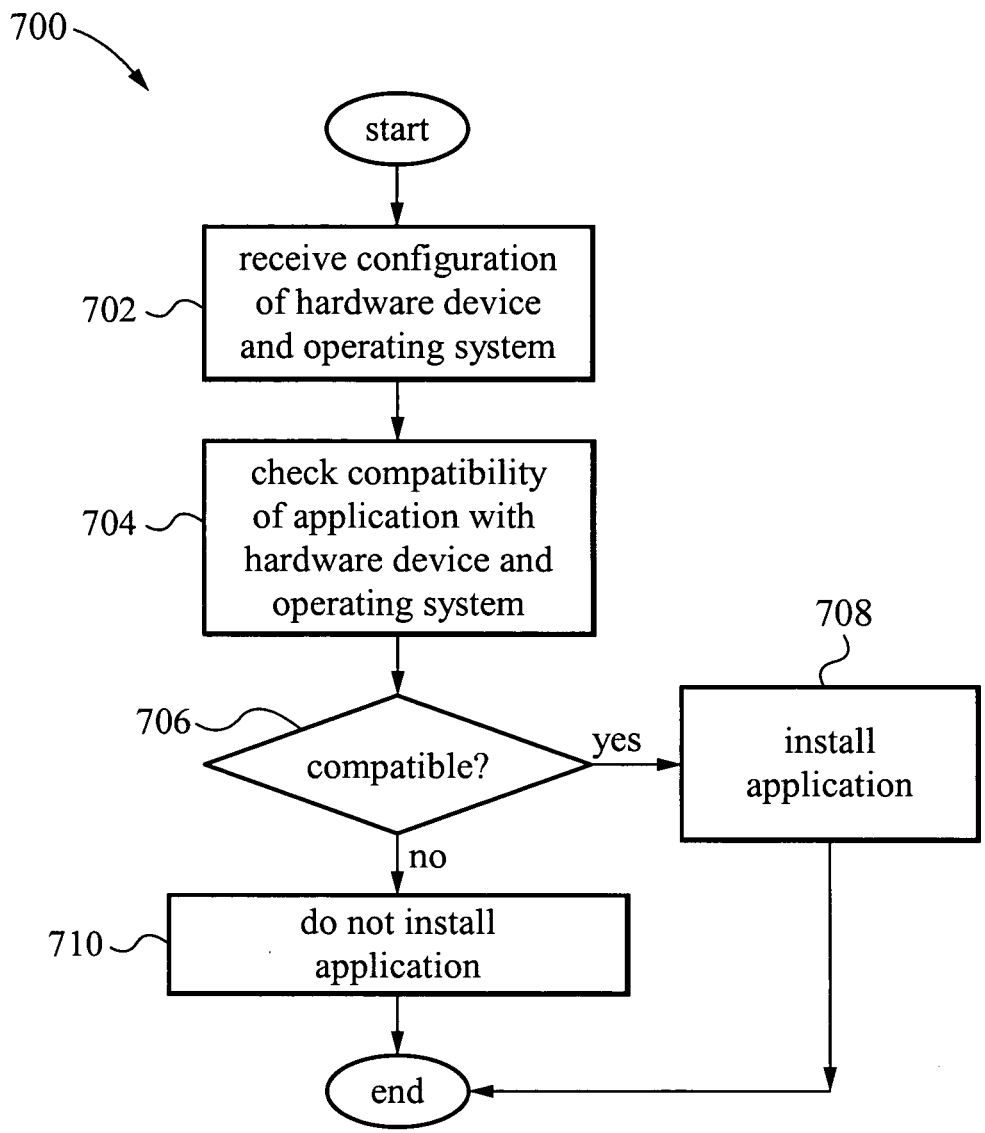
FIG. 7 is a flowchart for an operating system and hardware compatibility process of the VAM, in accordance with the present invention.

FIG. 7 is a flowchart for an operating system and hardware compatibility process 700 of the VAM 100, in accordance with the present invention. The VAM 100 maintains a mapping between document (or file) types and the appropriate application compatible with the particular hardware device and its operating system. When a user logs into the VAM 100, the VAM 100 receives the configuration of the hardware device and operating system in step 702. Also, the VAM 100 undergoes a synchronization process 306, as mentioned above with reference to FIG. 4. During the synchronization process 306, the manager may install new applications in step 412. Alternatively, the user may instruct the VAM 100 to install an application at a time other than during the time of login. For the application to be installed, the VAM 100 checks whether the application is compatible with the particular hardware and its operating system. The VAM 100 can check compatibility because the server system 104 keeps a database record 500 for each application and because the VAM 100 obtained configuration information in step 702.

Performing the compatibility process 700 allows the VAM 100 to do at least the following: prevent an incompatible application from being installed on a particular environment; select the compatible version of the application to be installed; and support a user moving from one client computer to another client computer, even when the hardware and operating system are not compatible and require different applications or application versions.

If the manager determines in decision operation 706 that the application to be installed is not compatible with the particular hardware and operating system, the compatibility process 700 proceeds to step 710. In such a case, the VAM 100 does not install the application. On the other hand, if the VAM 100 determines that the application is compatible with the particular hardware and operating system, the compatibility process 700 proceeds to step 708. In such a case, the VAM 100 downloads the application from the server system 104 and installs the application on the client computer 101. The compatibility process 700 is then completed.

Figure 8:
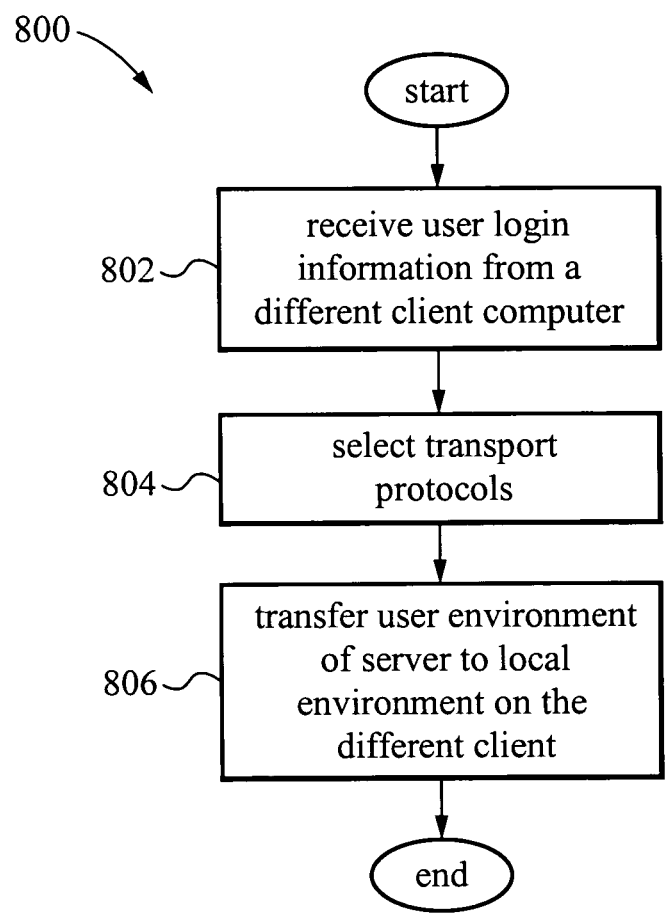
FIG. 8 is a flowchart for a transfer process of the VAM for when a user moves to a different client computer, in accordance with the present invention.

FIG. 8 is a flowchart for a transfer process 800 of the VAM 100 for when a user moves to a different client computer, in accordance with the present invention. The client computer 101 contains a client application database 210, which includes a replication of the application software catalog on the server system 104 and a catalog of the applications to which the user is subscribed. The client application database 210 also contains a copy of the user preferences stored centrally on the server system 104. As mentioned above with reference to FIG. 2, an entire user environment is transferred over the network 105 from the server transaction processor 204 onto this transient database created on the client computer 101.

When a user moves to a different client computer, the user may log into the VAM 100. In such a case, the VAM 100 receives the user login information from the different computer in step 802. Such login information may contain, for example, a username and a password. Each user account has an associated user profile. The user profile includes, among other things, a list of installed applications. The user profile is editable by the user. In step 804, the VAM 100 selects the appropriate transport protocols or network access methods based on the user profile and parameters initially defined by the central administrator's installation selection. Each of the network access methods support server based remote hosted application storage or server based application execution. Accordingly, the VAM 100 can make this movement to the different client computer a process that is relatively seamless. The VAM 100, in step 806, transfers the user environment configuration stored on the server system 104 to the client environment on the different client computer.

Figure 9:
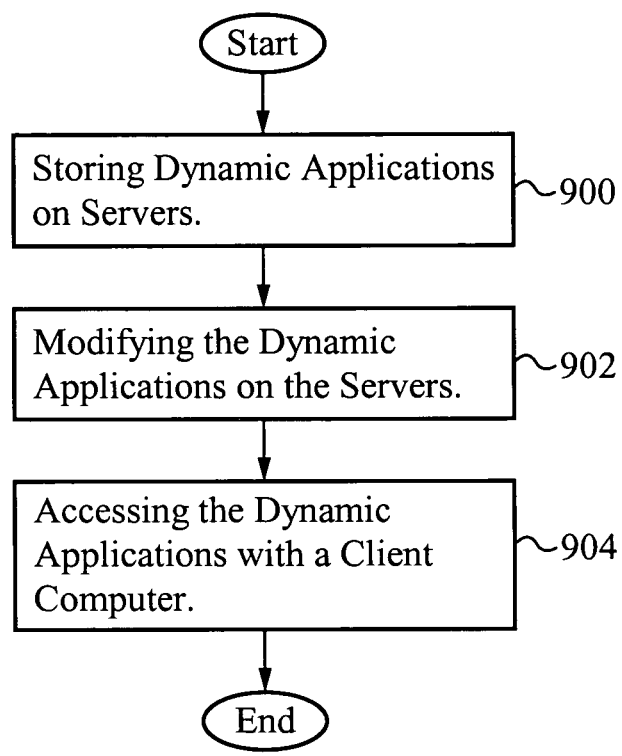
FIG. 9 is a flowchart illustrating a process for utilizing the present invention to provide applications as a service.

FIG. 9 illustrates a flowchart illustrating a process for utilizing the present invention to provide applications as a service. In the step 900, the applications are stored on central servers. Instead of having to manually update each application when there is an upgrade available or a patch needed, the applications are modified on the central servers, in the step 902. Such modifications transform the applications from static to dynamic, since they are continually changing via updates, patches and other modifications. In the step 904, the dynamic applications are accessed by the user with the client computer. Since the applications are available to the users using the VAM, the updated application is not only available on the current client computer the user is utilizing, but the updated application is also available on any other client computer where the user has a profile on the central servers.

The VAM 100 may be used in conjunction with the virtual distributed file system (VDFS), which is discussed in further detail in U.S. Provisional Pat. App. No. 60/577,148, filed Jun. 3, 2004, entitled "Virtual Management System". Accordingly, the VAM 100 may have the ability to provide application module installation pipelining, which is a process that is initiated when a user moves to a different client computer. When a user initially logs into a new client computer, the VDFS modules transfer the statistically often-used program modules to this different client computer. Such a transfer process prevents delays when running applications on the different client computer for the first time. The VAM 100 knows the entire application set to which the user is subscribed and has statistics on how often each module is accessed. With this knowledge, the VAM 100 can initiate the preloading of often-used user applications on the client computer. The VDFS transfers only the statistically often-used modules. This process is done in the background, using network resources not used by the user. This process, thereby, does not impede network performance.

According to systems and methods described above, the VAM 100 allows a user to use and run applications on a client computer 101, while the applications are stored and managed by a centralized server system 104. The VAM 100 includes but is not limited to hardware, software, firmware or any combination thereof.

Advantageously, the user may move freely from one client computer 101 to another client computer. When a user logs into the VAM 100 using the other client computer, the user's entire user environment, or a compatible portion thereof, is transferred from the server system 104 to the other client computer. Accordingly, the user is not limited to using only one particular client computer 101. Nor is the user limited to one particular type of operating system. The user also does not have to worry about carrying around applications to be installed on other client computers. The management of the applications, the user environment configuration, the client environment configuration, the transport protocols and the access methods, among other things, are handled by the server system 104. Such central management allows software vendors to rent software packages and to control time limits on applications via the VAM 100. Software vendors can thereby manage application subscriptions, even if the software packages are stored locally on a client computer 101.

Capabilities of a Virtual Application Manager

The VAM 100 provides desirable capabilities discussed above and further highlighted in the following discussion.

Centralization—This technology provides the ability for a user to use and run applications that are stored on and managed by a centralized location.

ASP—The technology has the facilities to support an application service provider (ASP).

Enterprise—The technology can benefit business enterprise application architectures.

Robust—The VAM 100 is capable of executing and managing resource intensive applications requiring support for high CPU utilization, high-end graphics and audio support.

Movable applications—The applications defined within a user's profile will run on any hardware system the user logs into. The user can thereby move from one client computer to another and have his application follow.

Offline operation—The software applications have the ability to run disconnected from the central server and network. The applications do not have to be stored and run solely at the server system 104. The applications may be stored and run from client computer, thereby allowing offline operation.

Quick installation—the software is capable of running on a user's computer with a minimal setup delay. Minimal setup time is required to allow applications to move from one client computer to another.

Installation management—The system provides an infrastructure for systems to provide installation and configuration management.

Full software install—The software should optionally be fully installable to support full offline usage when disconnected from the network.

Patch management—User applications should be automatically updated and maintained from the central location. This allows the application of patches and updates to be managed centrally and automatically.

Scalability—The system should be scaleable to support extremely large ASP user bases over disparate network topologies.

License/subscription management—The system supports subscription licenses. So, when the subscription is void or expired, the desktop software will become disabled and inactive.

Versatile—The system provides support for disparate end user hardware, including IBM® compatible PC's, Apple® PC's, thin clients and personal digital assistants.

Multiple transports—The system will run over multiple network and application protocols, including server based computing transports created by Citrix® and Tarantella® corporations, Unix X11 xTerm® protocols, and network file access protocols including Microsoft® SMB/Netbios, Netware®, Unix NFS®, and the virtual distributed file system (VDFS).

Billing—Usage data should be available to track application usage, including access times and durations.

Subscriptions—Control over application usage has to be available to allow centrally an application's usage, such as allowing a time limit on an application, after which the application even if stored locally will expire and be inoperable.

System and Method Implementation of a Virtual Application Manager

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving user login information, accessing a user profile associated with the login information wherein the user profile includes a user environment configuration, selecting transport protocols based on the user profile wherein the transport protocols are protocols for transporting information between the server system and the client computer, and synchronizing the user environment configuration with a client environment configuration on the client computer, according to processes of the present invention.

In addition to the aforementioned uses for the present invention, the present invention allows static software to be treated as a service such as a World Wide Web service delivered over a network. Software as a Service (SaaS) is a model of software delivery where specific activities provide users access to software allowing that user to avoid maintenance and technical support issues with the software. Static software is that which is installed and then generally left alone. Utilizing the present invention, static software is able to act dynamically thus making it more like a service. With the present invention, software applications are stored on the central server and are then made available on the client computers. The software is able to be modified at the central server and then dynamically updated at the client computers. The term "dynamic" is utilized to indicate that the software is modified at the central server and then distributed to the client machines in the same way that a service is distributed. Hence, only one modification is required to update an entire network of systems, as opposed to modifying each separate client. For example, a system includes the Microsoft® web browser, Internet Explorer. The web browser software is made available to the users through the central server. Within a week of the initial installation, ten new security flaws are discovered for Internet Explorer and Microsoft® generates a patch to correct these flaws. Instead of each individual user having to download and install the new patch, the patch is installed at the central server and then when a user accesses his account via a client computer, the updated Internet Explorer will be retrieved. As described above, the changes to the software also travel with the user when the user switches client computers. In some embodiments, the software is stored locally while in other embodiments it is stored remotely. Additionally, the software is able to be selected by a user based on a variety of different requirements such as the data type or more specifically the document type, for example, .doc for a Microsoft® Word file. Also, the software is able to be selected based on the operating system where, for example, a Linux user is able to utilize Linux compatible applications instead of Windows® only ones.

Furthermore, unlike typical central networking configurations where the user data is stored at a central database, and a user must remain logged onto the network to retrieve such data, the present invention does not have these limitations. The present invention is able to function as a central database while also providing local access to data. As the user utilizes the client computer, the data is stored locally on the client computer but is also mirrored at the central server. Thus, if the user changes client computers, the user is able to access that same local data from the previous client computer because it is able to be retrieved from the central server. However, once it is retrieved, the user no longer needs to remain coupled to the central server as the data is stored locally again. For mirroring purposes, the user does need to recouple to the central server, but to simply utilize the data, the user does not. Therefore, as described above, the present invention provides the benefits of portability, stability, supportability, protection and reliability without the drawbacks of typical centrally located database systems. Hence, the present invention is a pseudo-centrally located database system with the benefits but not the penalties of a centrally located database system.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for permitting applications to be treated as a service, instructions for the applications are stored on memory executed by a hardware processor, the system comprising:
  a. one or more servers having server memory storing a set of applications and a set of user profiles; and
  b. one or more client computers coupled to the one or more servers for receiving the set of applications modified at the one or more servers, wherein the set of user profiles indicate which applications within the set of applications are to be transmitted to the one or more client computers;

wherein one or more of the applications transmitted to the client computers are associated with a time period after which the associated application will become inoperable on the client computers, the time period being stored on the server in the user profile, and upon login by the user, the time period stored on the server being verified by the one or more servers.

2. The system as claimed in claim 1 further comprising one or more databases coupled to the one or more servers.

3. The system as claimed in claim 2 wherein the one or more databases contain the set of applications.

4. The system as claimed in claim 1 further comprising a client environment stored on the one or more client computers.

5. The system as claimed in claim 4 wherein the set of user profiles includes a user environment configuration stored on the one or more servers.

6. The system as claimed in claim 5 wherein the client environment and the user environment configuration are synchronized.

7. The system as claimed in claim 5, wherein the set of user profiles further includes a list of one or more authorized applications to which the user is subscribed, wherein the set of applications include at least the one or more authorized applications.

8. The system as claimed in claim 7, wherein the set of applications include one or more unauthorized applications to which the user is not subscribed.

9. The system as claimed in claim 1, wherein the set of applications are able to be executed while the one or more client computers are decoupled from the one or more servers.

10. The system as claimed in claim 1, wherein the set of applications are stored locally.

11. The system as claimed in claim 1, wherein the set of applications are stored remotely.

12. The system as claimed in claim 1, wherein the set of applications are selected based on a document type.

13. The system as claimed in claim 1, wherein the set of applications are selected based on an operating system.

14. A system for permitting applications to be treated as a service, instructions for the applications are stored on memory executed by a hardware processor, the system comprising:
   a. one or more servers having server memory storing a set of applications and a set of user profiles;
   b. one or more client computers coupled to the one or more servers for receiving the set of applications modified at the one or more servers and available to the one or more client computers; and
   c. one or more first databases stored on database memory and coupled to the one or more client computers for storing data;
   wherein the set of user profiles indicate which applications within the set of applications are to be transmitted to the one or more client computers, wherein one or more of the applications transmitted to the client computers are associated with a time period after which the associated application will become inoperable on the client computers,
   the time period being stored on the server in the user profile, and
   upon login by the user, the time period stored on the server being verified by the one or more servers.

15. The system as claimed in claim 14 further comprising one or more second databases coupled to the one or more servers.

16. The system as claimed in claim 15 wherein the one or more second databases contain the set of applications.

17. The system as claimed in claim 15 wherein the one or more second databases mirror user data.

18. The system as claimed in claim 14 further comprising a client environment stored on the one or more client computers.

19. The system as claimed in claim 18 wherein the set of user profiles includes a user environment configuration stored on the one or more servers.

20. The system as claimed in claim 19 wherein the client environment and the user environment configuration are synchronized.

21. The system as claimed in claim 18, wherein the set of user profiles further includes a list of one or more authorized applications to which the user is subscribed, wherein the set of applications includes at least the one or more authorized applications.

22. The system as claimed in claim 21, wherein the set of applications includes one or more unauthorized applications to which the user is not subscribed.

23. The system as claimed in claim 14, wherein the set of applications are able to be executed while the one or more client computers are decoupled from the one or more servers.

24. The system as claimed in claim 14, wherein the set of applications are stored locally.

25. The system as claimed in claim 14, wherein the set of applications are stored remotely.

26. The system as claimed in claim 14, wherein the set of applications are selected based on a document type.

27. The system as claimed in claim 14, wherein the set of applications are selected based on an operating system.

28. A method of utilizing applications as a service comprising:
   a. storing one or more applications on one or more servers;
   b. modifying the one or more applications on the one or more servers; and
   c. receiving and accessing the one or more applications stored on the one or more servers with one or more client computers;
   wherein a set of user profiles indicates which applications within the one or more applications are to be transmitted to the one or more client computers, wherein one or more of the applications transmitted to the client computers are associated with a time period after which the associated application will become inoperable on the client computers,
   the time period being stored on the server in the user profile, and
   upon login by the user, the time period stored on the server being verified by the one or more servers.

29. The method as claimed in claim 28 wherein one or more databases are coupled to the one or more servers.

30. The method as claimed in claim 29 wherein the one or more databases contain the applications.

31. The method as claimed in claim 28 wherein a client environment is stored on the one or more client computers.

32. The method as claimed in claim 31 wherein a user profile including a user environment configuration is stored on the one or more servers.

33. The method as claimed in claim 32 wherein the client environment and the user environment configuration are synchronized.

34. The method as claimed in claim 32, wherein the user profile further includes a list of one or more authorized applications to which the user is subscribed, wherein the one or more stored applications includes at least the one or more authorized applications.

35. The method as claimed in claim 34, wherein the one or more stored applications includes one or more unauthorized applications to which the user is not subscribed.

36. The method as claimed in claim 28, wherein the applications are able to be executed while the one or more client computers are decoupled from the one or more servers.

37. The method as claimed in claim 28, wherein one or more databases are coupled to the one or more client computers.

38. The method as claimed in claim 37, further comprising mirroring the data within the one or more databases at the one or more servers.

39. The method as claimed in claim 28, wherein the one or more of applications are stored locally.

40. The method as claimed in claim 28, wherein the one or more of applications are stored remotely.

41. The method as claimed in claim 28, further comprising selecting the one or more applications based on a document type.

42. The method as claimed in claim 28, further comprising selecting the one or more applications based on an operating system.

43. A system for permitting applications to be treated as a service, instructions for the applications are stored on memory executed by a hardware processor, the system comprising:
  a. at least one server having server memory that stores a user environment, a set of applications and a set of user profiles; and
  b. at least one client computer coupled to the at least one server for receiving the set of applications modified at the at least one server, wherein the set of user profiles indicate which applications within the set of applications are to be transmitted to the at least one client computer, wherein one or more of the set of applications transmitted to the client computer are associated with a time period after which the associated application will become inoperable on the client computer, the time period being stored on the server in the user profile, the time period stored on the server being verified by the one or more servers upon login by the user, and wherein, when a user accesses at least one second client computer, the at least one server transfers one or more portions of the user environment based on the compatibility of the portions and the second client computer.

44. A system for permitting applications to be treated as a service, instructions for the applications are stored on memory executed by a hardware processor, the system comprising:
  a. one or more servers having server memory storing a set of applications and a set of user profiles; and
  b. one or more client computers coupled to the one or more servers for receiving the set of applications modified at the one or more servers, wherein the set of user profiles indicate which applications within the set of applications are to be transmitted to the one or more client computers;
  wherein one or more of the applications transmitted to the client computers are stored on the client computers encrypted and associated with a time period after which the associated application will become inoperable on the client computers and icons and links associated with an expired application are removed or made inactive, the time period being stored on the server in the user profile, the time period stored on the server being verified by the one or more servers upon login by the user, and wherein, upon determining a user logging into the one or more client computers, transferring program modules based on statistical use to the one or more client computers.

* * * * *